(12) United States Patent
Tanaka et al.

(10) Patent No.: US 11,465,491 B2
(45) Date of Patent: Oct. 11, 2022

(54) VEHICLE

(71) Applicant: Mazda Motor Corporation, Hiroshima (JP)

(72) Inventors: Hiroshi Tanaka, Aki-gun (JP); Satoshi Ueno, Aki-gun (JP); Hiroshi Kinoshita, Aki-gun (JP); Kei Yonemori, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/343,974

(22) Filed: Jun. 10, 2021

(65) Prior Publication Data

US 2022/0001741 A1 Jan. 6, 2022

(30) Foreign Application Priority Data

Jul. 1, 2020 (JP) .............................. JP2020-113745

(51) Int. Cl.
*B60K 11/04* (2006.01)
*B60K 6/46* (2007.10)

(52) U.S. Cl.
CPC ................ *B60K 11/04* (2013.01); *B60K 6/46* (2013.01)

(58) Field of Classification Search
CPC . B60K 11/04; B60K 11/02; B60K 6/46; F01P 3/18; F01P 2003/182; F01P 2003/185; F01P 2003/187
See application file for complete search history.

(56) References Cited

U.S. PATENT DOCUMENTS

| | | | |
|---|---|---|---|
| 7,077,224 B2 * | 7/2006 | Tomatsuri ................ | B60K 3/00 123/142.5 R |
| 8,763,376 B2 * | 7/2014 | Garnepudi ................ | F01P 3/20 60/320 |
| 2021/0016765 A1 * | 1/2021 | Toda ......................... | B60L 9/18 |

FOREIGN PATENT DOCUMENTS

| | | | | |
|---|---|---|---|---|
| GB | 2454349 A | * | 5/2009 | ............... B60K 1/02 |
| JP | 2019162964 A | | 9/2019 | |

\* cited by examiner

*Primary Examiner* — John D Walters
(74) *Attorney, Agent, or Firm* — Alleman Hall Creasman & Tuttle LLP

(57) ABSTRACT

A drive unit has engines and a motor that are adjacent to each other in a longitudinal direction. The engines are provided with an engine oil path and a coolant path for cooling. The motor is provided with a motor cooling oil path for cooling. A first heat exchanger, in which engine oil and motor cooling oil exchange heat, and a second heat exchanger, in which a coolant and the motor cooling oil exchange heat, are provided. A second size in vertical and lateral directions of the motor is smaller than a first size in the vertical and lateral directions of each of the engines. The second heat exchanger is attached to an upper portion of a side circumferential portion of the motor, and the first heat exchanger is attached to a lower portion of the side circumferential portion of the motor.

20 Claims, 11 Drawing Sheets

VEHICLE

TECHNICAL FIELD

The present invention relates to a vehicle and, in particular, to a cooling structure of a drive unit that has an engine and a motor.

BACKGROUND ART

In recent years, for purposes of reducing an environmental load and the like, hybrid vehicles including a motor in addition to an engine as drive sources of vehicle travel have been widespread.

In Patent Document 1, an automobile that includes an engine and a motor as drive sources of vehicle travel is disclosed. In the automobile disclosed in Patent Document 1, both of the engine and the motor, which are provided as the drive sources of the vehicle travel, are mounted in a front area.

The automobile disclosed in Patent Document 1 can be switched between an engine-drive mode in which the automobile travels by using the engine and a motor-drive mode in which the automobile travels by using the motor. When a driver selects the motor-drive mode, the automobile is driven by the motor.

Meanwhile, when the driver selects the engine-drive mode, the motor implements a torque assist function at a start of the automobile, and the automobile is driven by the engine at a specified vehicle speed or higher.

PRIOR ART DOCUMENTS

Patent Documents

Patent Document 1: JP2019-162964A

SUMMARY OF THE INVENTION

Problem to be Solved by the Invention

Further improvement in vehicle motion performance has been requested for the hybrid vehicle as described above. When attempting to improve the vehicle motion performance, it is beneficial to arrange the drive unit, which includes the engine and the motor, in an area near a center of the vehicle. By arranging the drive unit just as described, the vehicle can easily turn, and the vehicle motion performance can be improved.

However, since an occupant space is provided in the area near the center of the vehicle, a mounting space for the drive unit is limited therein. Thus, downsizing of the drive unit is required to arrange the drive unit in the area near the center of the vehicle for the purpose of improving the vehicle motion performance.

The present invention has been made to solve the problem as described above, and therefore has a purpose of providing a vehicle, vehicle motion performance of which can be made high by downsizing a drive unit having an engine and a motor.

Means for Solving the Problem

When the drive unit is driven for travel of the vehicle, the engine and the motor generate heat. Thus, cooling means for cooling the engine and the motor has to be provided for the drive unit. However, in the case where a cooling system for cooling the engine and a cooling system for cooling the motor are separately provided, an increase in size of the drive unit cannot be avoided due to provision of the cooling means.

In view of the above, as a measure for further improvement in the vehicle motion performance, the present inventors considered to share the cooling means as the cooling system for cooling the engine and as the cooling system for cooling the motor, so as to downsize the drive unit provided with the cooling means. More specifically, the present inventors considered that, compared to the case where the cooling systems were separately provided, the drive unit provided with the cooling means could be downsized by using a coolant circulation path and an engine oil circulation path provided in the engine cooling system as means for cooling the motor. When the drive unit provided with the cooling means can be downsized just as described above, a mounting position of the drive unit in the vehicle can be set to the area near the center of the vehicle, and the vehicle motion performance can be improved.

However, in the case where the cooling means is shared among the engine and the motor as described above, a heat exchanger has to be provided for heat exchange between cooling refrigerants for the engine and the motor. In addition, in the case where the heat exchanger is arranged in a vertical direction of the engine, the drive unit, in which the heat exchanger is disposed, is enlarged in the vertical direction.

Meanwhile, in the case where the heat exchanger is arranged in front of or behind the engine, a longitudinal length of the drive unit is increased by the heat exchanger arranged longitudinally in the drive unit, which also leads to the enlargement of the drive unit. In addition, in the case where a longitudinal length of a set configuration of the drive unit is increased, it is a concern that vibration (displacement) with drive wheels being an origin becomes significant at the time of driving of the drive unit.

In view of the above, a vehicle according to one aspect of the present invention includes: a drive unit that is a drive source for travel of the vehicle and has an engine and a motor arranged adjacent to each other in a first direction of the vehicle; an engine oil path as a path of engine oil for cooling the engine; a coolant path as a path of a coolant for cooling the engine; a motor cooling oil path as a path of oil for cooling the motor; a first heat exchanger by which the engine oil flowing through the engine oil path and the oil flowing through the motor cooling oil path exchange heat; and a second heat exchanger by which the coolant flowing through the coolant path and the oil flowing through the motor cooling oil path exchange the heat. When the drive unit is seen in the first direction, the motor is formed to have a smaller size in a second direction, which is orthogonal to the first direction, than the engine. The first heat exchanger and the second heat exchanger are attached to a side circumferential portion of the motor.

Since the vehicle according to the above aspect includes: the first heat exchanger by which the engine oil and the motor cooling oil exchange the heat; and the second heat exchanger by which the coolant and the motor cooling oil exchange the heat, heat generated during driving of the motor can be cooled by using the engine cooling path. In other words, in the vehicle according to the above aspect, the cooling means is shared among the motor and the engine. Accordingly, compared to a case where the cooling means is separately provided for the motor and the engine, it is possible to downsize the drive unit provided with the cooling means. As a result, the drive unit can be mounted in a region near a center of the vehicle, and the center of gravity of the vehicle can be positioned at or near the center of the vehicle. In this way, in the vehicle according to the above aspect, vehicle motion performance can be improved.

In addition, in the vehicle according to the above aspect, by using the fact that the motor has the smaller size in the second direction than the engine, the first heat exchanger and the second heat exchanger are attached to the side circumferential portion of the motor. Thus, compared to a case where the first heat exchanger and the second heat exchanger are attached to the engine or to a rear side of the motor, it is possible to downsize the drive unit in a state where the first heat exchanger and the second heat exchanger are disposed. Also, in this way, the drive unit can be mounted in the region near the center of the vehicle, and the center of gravity of the vehicle can be positioned at or near the center of the vehicle. Thus, the vehicle motion performance can be improved.

Furthermore, in the vehicle according to the above aspect, the first heat exchanger and the second heat exchanger are attached to the side circumferential portion of the motor. Thus, also, in the case where the drive unit is mounted in a front area of the vehicle, for example, it is possible to suppress a longitudinal length of the above set configuration to be short. Therefore, in the vehicle according to the above aspect, it is also possible to minimize a reduction in size of an occupant space.

In the vehicle according to the above aspect, the engine may have a piston and an engine housing that accommodates the piston, the motor may have a rotor-and-stator and a motor housing that accommodates the rotor-and-stator, the engine oil path and the coolant path may be formed in the engine housing, and the motor cooling oil path may be formed in the motor housing.

When the above configuration is adopted, the engine oil path and the coolant path are formed in the engine housing, and the motor cooling path is formed in the motor housing. In this way, compared to a case where each of the paths for connecting the first heat exchanger and the second heat exchanger is formed on the outside of the engine housing and the motor housing, each of the paths can be shortened. In addition, the formation of each of the paths not on the outside of the engine housing and the motor housing is further effective for downsizing of the drive unit in the state where the first heat exchanger and the second heat exchanger are disposed.

In the vehicle according to the above aspect, the first direction of the vehicle may be a longitudinal direction of the vehicle, and the first heat exchanger and the second heat exchanger may be attached in a mutually separated manner in a vertical direction to the side circumferential portion of the motor.

When the above configuration is adopted, the first heat exchanger and the second heat exchanger are provided in the mutually separated manner in the vertical direction to the side circumferential portion of the motor. In this way, for example, compared to a case where the first heat exchanger and the second heat exchanger are attached in a laterally aligned manner to the side circumferential portion of the motor, the drive unit can effectively be downsized in the state where the first heat exchanger and the second heat exchanger are disposed.

The vehicle according to the above aspect may further include an ebullient cooler having: a circulation path for circulating an ebullient cooling refrigerant, a boiling point of which is lower than that of the oil for cooling the motor; an ebullient section that is disposed in the middle of the circulation path and in which the oil and the ebullient cooling refrigerant exchange heat; and a condensation section that condenses the ebullient cooling refrigerant.

When the above configuration is adopted, the motor can be tooled not only by using an engine cooling system but also by using the ebullient cooler. Thus, even in the case where the motor is driven to generate a high output or is continuously driven for a long time, the motor can be maintained at an appropriate temperature.

In the vehicle according to the above aspect, the ebullient cooler may further have an ebullient cooler fan that is arranged adjacent to a lower portion of the condensation section and cools the condensation section by air, and the ebullient cooler fan may blow the air upward.

When the above configuration is adopted, the ebullient cooler fan can blow the air toward the condensation section arranged above. Thus, the ebullient cooling refrigerant can be condensed with high efficiency in the condensation section. This is further effective for maintaining the motor at the appropriate temperature by further reliably cooling the motor.

In the vehicle according to the above aspect, the first direction of the vehicle may be the longitudinal direction of the vehicle, the motor may be arranged adjacent to a rear side of the engine in the first direction, and the condensation section and the ebullient cooler fan of the ebullient cooler may be arranged adjacent to a rear side of the motor in the first direction.

When the above configuration is adopted, the condensation section and the ebullient cooler fan of the ebullient cooler are arranged on the rear side of the motor. In this way, it is possible to suppress transfer of the heat dissipated from the condensation section to the motor. This is further effective for maintaining the motor at the appropriate temperature by further reliably cooling the motor.

In the vehicle according to the above aspect, in the case where the first heat exchanger, the second heat exchanger, and the ebullient section of the ebullient cooler are seen in the first direction of the vehicle, the first heat exchanger, the second heat exchanger, and the ebullient section of the ebullient cooler may be attached in a mutually separated manner to the side circumferential portion of the motor.

When the above configuration is adopted, compared to a case where the first heat exchanger, the second heat exchanger, and the ebullient section are attached to the side circumferential portion of the motor in a manner to be close to each other, the size of the motor in the second direction can be reduced.

In the vehicle according to the above aspect, the motor cooling oil path may have a first motor cooling oil path and a second motor cooling oil path that are different paths from each other, in the first heat exchanger, the engine oil flowing through the engine oil path and the oil flowing through the first motor cooling oil path may exchange heat, and in the second heat exchanger, the coolant flowing through the coolant path and the oil flowing through the second motor cooling oil path may exchange heat. The vehicle may further include: an oil control valve for switching between the first motor cooling oil path and the second motor cooling oil path; an engine coolant temperature sensor for detecting a temperature of the engine; and a controller for controlling the oil control valve on the basis of the temperature of the engine.

When the above configuration is adopted, the path related to cooling of the motor based on the temperature of the engine is switched during driving of the motor. In this way, cooling of the motor by sharing the engine cooling system is optimized. For example, in the case where the temperature of the engine is lower than a specified temperature, the motor is cooled by transferring the heat thereof to the engine oil. In the case where the temperature of the engine is equal to or higher than the specified temperature, the motor can be cooled by transferring the heat thereof to the coolant. The vehicle has a radiator for cooling the coolant, and the radiator includes a radiator fan. Thus, even when the temperature of the engine becomes high, the motor can effectively be maintained at the appropriate temperature.

In the case where the vehicle travels by the motor, the temperature of the engine, which is low, can be increased by the heat of the motor, which is transferred thereto via the engine oil and the coolant. Thus, it is possible to improve engine efficiency at the time of shifting to travel of the vehicle by the engine.

In the vehicle according to the above aspect, each of the first heat exchanger and the second heat exchanger may have a flat external shape in which a height in an attachment direction to the side circumferential portion of the motor is smaller than a length and a width in a direction that crosses the attachment direction.

When the above configuration is adopted, the adoption of the first heat exchanger and the second heat exchanger, each of which has the flat external shape, is effective for reducing the size in the second direction of the motor in the state where these are attached to the side circumferential portion of the motor.

Advantage of the Invention

In regard to the vehicle according to each of the above aspects, it is possible to achieve the high vehicle motion performance of the vehicle by downsizing the drive unit that has the engine and the motor.

MODES FOR CARRYING OUT THE INVENTION

A description will hereinafter be made on an embodiment of the present invention with reference to the drawings. The embodiment, which will be described below, merely constitutes an example of the present invention, and the present invention is not limited to the following embodiment in any respect except for an essential configuration thereof.

Embodiment

1. Schematic Configuration of Vehicle 1

A description will be made on a schematic configuration of a vehicle 1 according to this embodiment with reference to FIG. 1.

Figure 1:
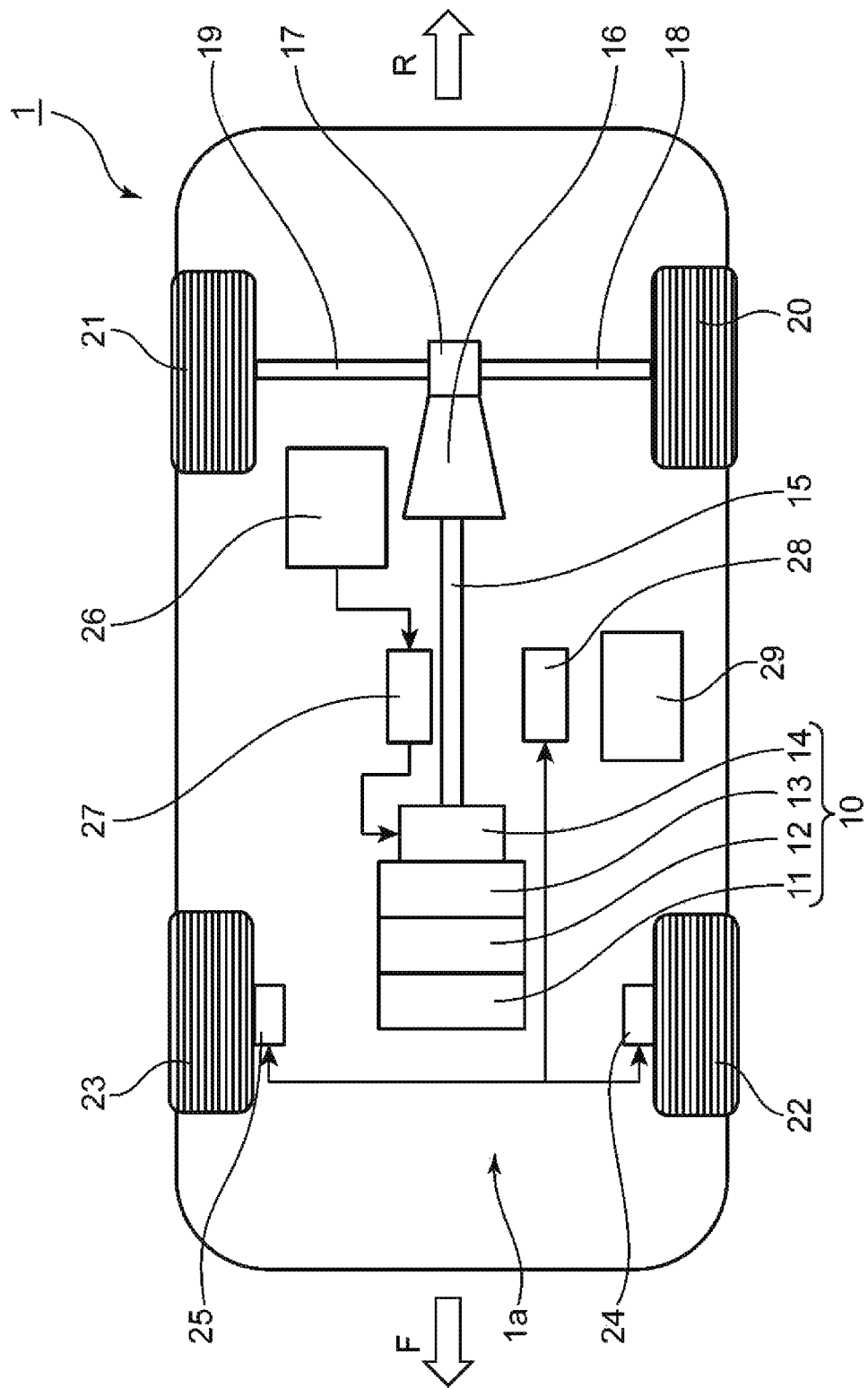
FIG. 1 is a schematic view illustrating an outline configuration of a vehicle according to an embodiment.

As illustrated in FIG. 1, in the vehicle 1, a drive unit 10 for driving the vehicle 1 is mounted to a rear portion in a front area 1a. The drive unit 10 includes engines 11 to 13 and a motor 14. A detailed structure of the drive unit 10 will be described below.

A propeller shaft 15 is connected to the drive unit 10. The propeller shaft 15 extends rearward at a center in a vehicle width direction of the vehicle 1. A rear end of the propeller shaft 15 is connected to a transmission 16.

A differential gear 17 is connected to the transmission 16. Driveshafts 18, 19 are respectively coupled to left and right portions of the differential gear 17 in the vehicle width direction. The driveshafts 18, 19 are connected to rear wheels 20, 21, respectively. That is, in the vehicle 1 according to this embodiment, the rear wheels 20, 21 are driven for travel by drive power that is generated by the drive unit 10 mounted in the front area 1a.

In the vehicle 1, motors 24, 25 are respectively connected to front wheels 22, 23. Although not illustrated in detail, the motors 24, 25 are so-called in-wheel motors. The motors 24, 25 function as assist motors that generate power at a start of the vehicle 1 and transmit the power to the front wheels 22, 23, respectively. The motors 24, 25 also function as regenerative brakes, each of which generates electricity during deceleration of the vehicle 1. The electricity, which is generated by the motors 24, 25 during the deceleration of the vehicle 1, is stored in a capacitor 28 and the like.

A battery 26 and an inverter 27 are also mounted to the vehicle 1. The battery 26 is an electricity storage module for supplying the electricity to the motor 14 of the drive unit 10. The battery 26 according to this embodiment is a lithium-ion battery, for example. The electricity from the battery 26 is supplied to the motor 14 via the inverter 27.

Here, the vehicle 1 according to this embodiment includes, as drive modes of the drive unit 10, an engine-drive mode and a motor-drive mode. The engine-drive mode is a mode in which the rear wheels 20, 21 are driven by the drive power output from the engines 11 to 13 and the vehicle 1 thereby travels. The motor-drive mode is a mode in which the rear wheels 20, 21 are driven by the drive power output from the motor 14 and the vehicle 1 thereby travels.

The vehicle 1 is configured that the motor 14 does not generate the drive power at the time of driving in the engine-drive mode and the engines 11 to 13 do not generate the drive power at the time of driving in the motor-drive mode.

In the vehicle 1, a drive mode control unit 29 executes switching control between the engine-drive mode and the motor-drive mode. The drive mode control unit 29 is configured to include a microcomputer that has a processor (i.e., a central processing unit (CPU)), memory (i.e., ROM and/or RAM), and the like. The drive mode control unit 29 executes drive mode control on the basis of an instruction from a driver, a situation of the vehicle 1 (a vehicle speed, acceleration/deceleration, a battery remaining amount), and the like.

2. Mounting Position of Drive Unit 10

Figure 2:
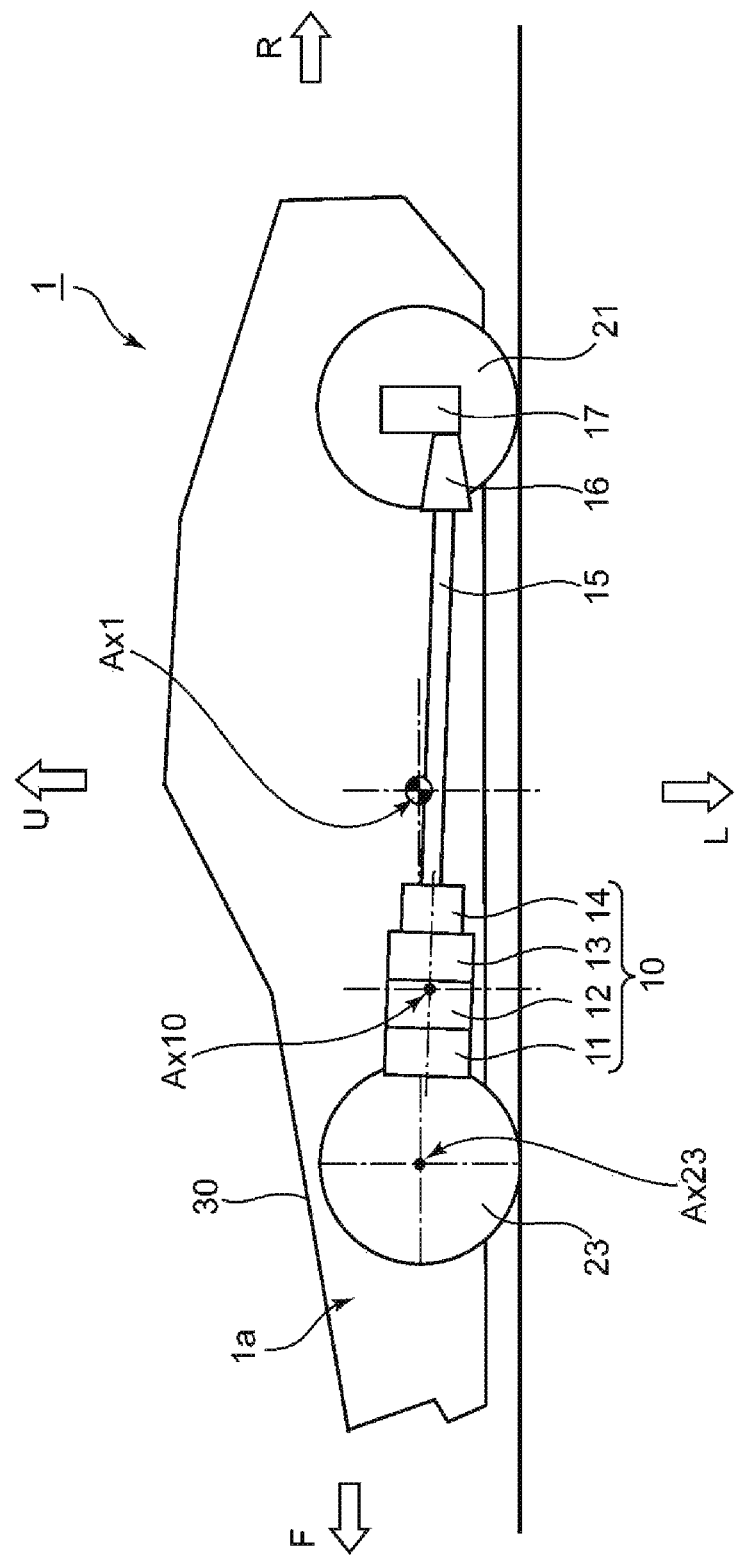
FIG. 2 is a schematic view illustrating a mounting position of a drive unit in the vehicle.

A description will be made on a mounting position of the drive unit 10 in the vehicle 1 with reference to FIG. 2.

As described above, in the vehicle 1, the drive unit 10 is mounted in the rear portion of the front area 1a. More specifically, the drive unit 10 is mounted such that a center of gravity Ax10 of the drive unit 10 is located behind a rotation center Ax23 of the front wheels 22, 23 (only the front wheel 23 is illustrated in FIG. 2). In addition, the drive unit 10 is mounted such that the center of gravity Ax10 thereof is located below the rotation center Ax23 of the front wheels 22, 23.

That is, in the vehicle 1, the drive unit 10 as a heavy object is made to be compact, and the drive unit 10 is thereby mounted in the rear portion of the front area 1a and in a lower portion having a clearance from a hood 30. In this way, a position Ax1 of center of gravity of the vehicle 1 can be set to a low position substantially at the center in a longitudinal direction of the vehicle 1.

3. Configurations of Drive Unit 10 and Peripheries

A description will be made on a detailed configuration of the drive unit 10 and configurations of peripheries thereof with reference to FIG. 3 to FIG. 8.

Figure 3:
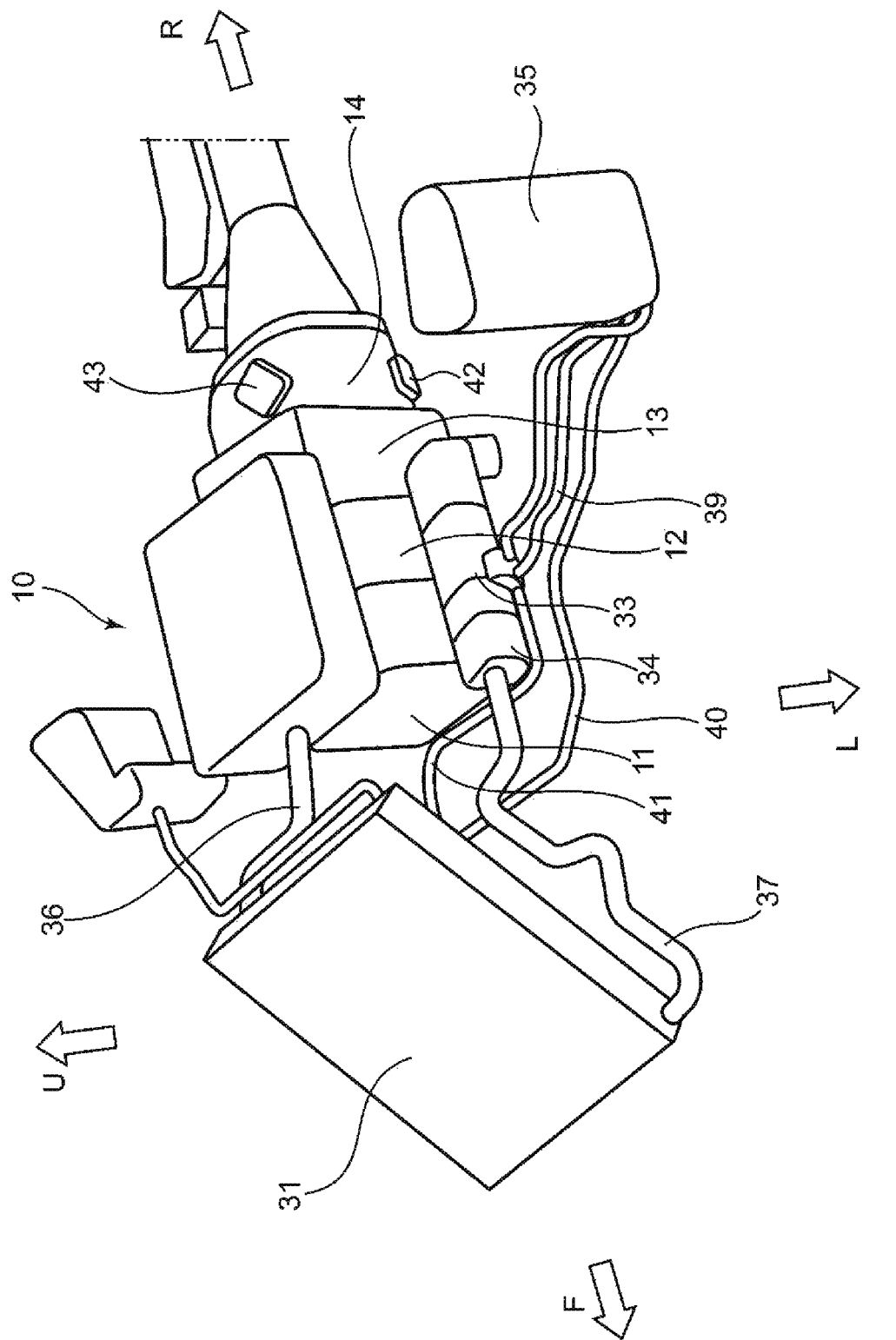
FIG. 3 is a perspective view illustrating a configuration of the drive unit.
Figure 4:
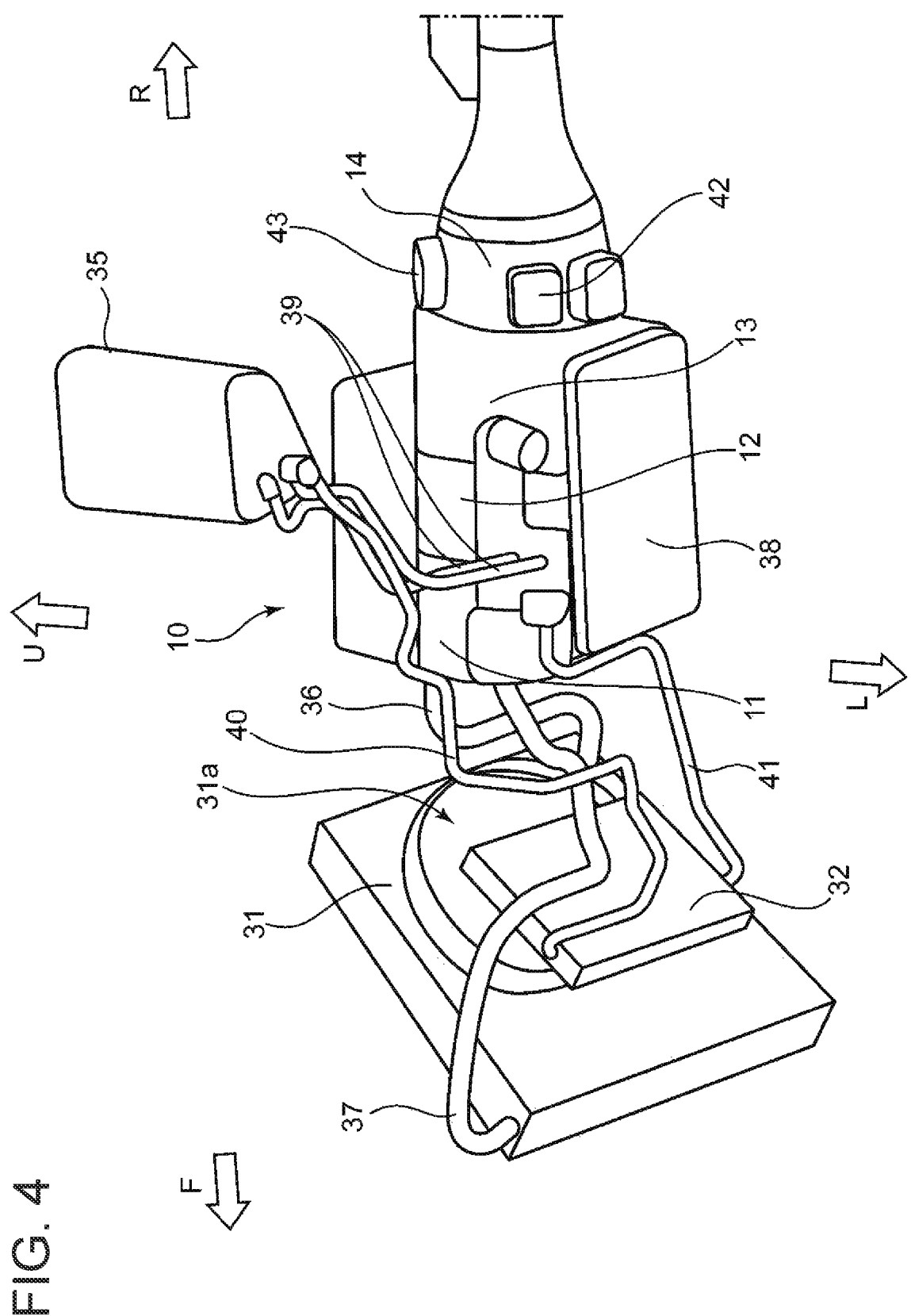
FIG. 4 is a perspective view illustrating the configuration of the drive unit.

As illustrated in FIG. 3 and FIG. 4, each of the engines 11 to 13 provided in the drive unit 10 is a rotary engine having a rotary piston as an example. The adoption of the rotary engines as the engines 11 to 13 in the vehicle 1 is beneficial for downsizing of the drive unit 10.

As illustrated in FIG. 4, an oil pan 38 is disposed below the engines 11 to 13. The oil pan 38 has a flat shape in which a dimension in a height direction is small in comparison with dimensions in the vehicle longitudinal direction and the vehicle width direction. This is beneficial to suppress a height of the drive unit 10 to be low.

As described above, in the vehicle 1 according to this embodiment, the oil pan 38 has the flat shape, and thus an accommodation volume of engine oil therein is low. For this reason, the oil pan 38 has a primary purpose of collecting the engine oil that has been distributed to the engines 11 to 13. Thus, an oil tank 35 is provided on a side of the drive unit 10 to store the engine oil collected in the oil pan 38.

As illustrated in FIG. 3 and FIG. 4, a radiator 31 and an oil cooler 32 are disposed in front of the drive unit 10. The radiator 31 is a device for cooling a coolant, a temperature of which has become high by heat from the engines 11 to 13, and has a radiator fan 31a on a rear side thereof.

The oil cooler 32 is arranged behind the radiator 31 and is disposed along the radiator 31. The oil cooler 32 is smaller in plane size than the radiator 31.

Pipes 36, 37 connect the engines 11 to 13 and the radiator 31. A water pump 34 is provided to a connection portion between the pipe 37 and each of the engines 11 to 13.

Each two of the oil cooler 32, the engines 11 to 13, the oil tank 35, and the oil pan 38 are connected by respective one of pipes 39 to 41 and the like. An oil pump 33 is provided to a connection portion between the pipe 41 and each of the engines 11 to 13.

Figure 5:
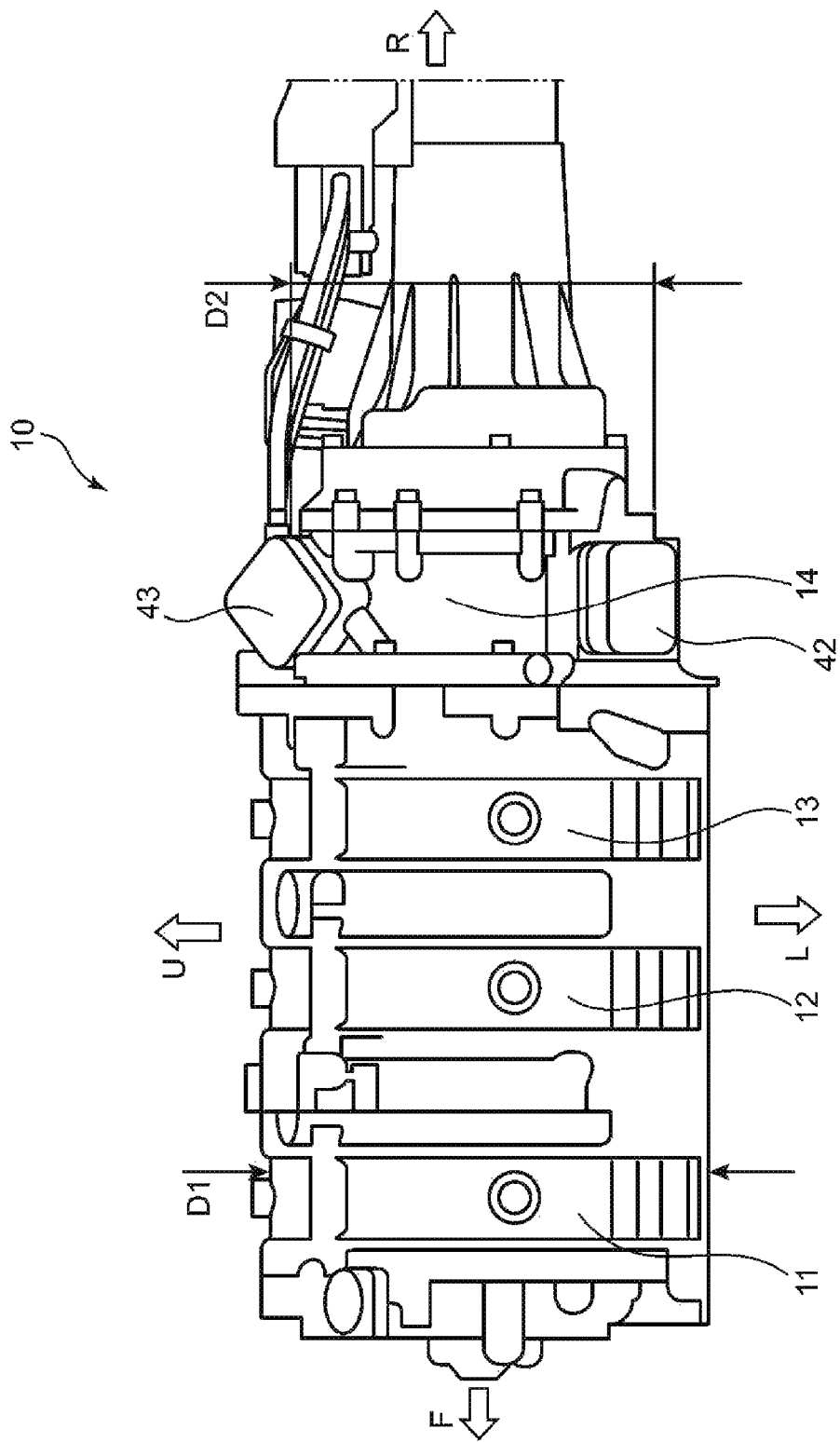
FIG. 5 is a side view illustrating a partial configuration of the drive unit.

As illustrated in FIG. 5, the motor 14 in the drive unit 10 is arranged adjacent to a rear side of the engine 13. The engines 11 to 13 and the motor 14 have a direct-coupling structure to share an output shaft. A size D2 of the motor 14 in a direction (a second direction) that is orthogonal to the vehicle longitudinal direction (a first direction) is smaller than a size D1 of the engines 11 to 13 in the second direction.

Figure 6:
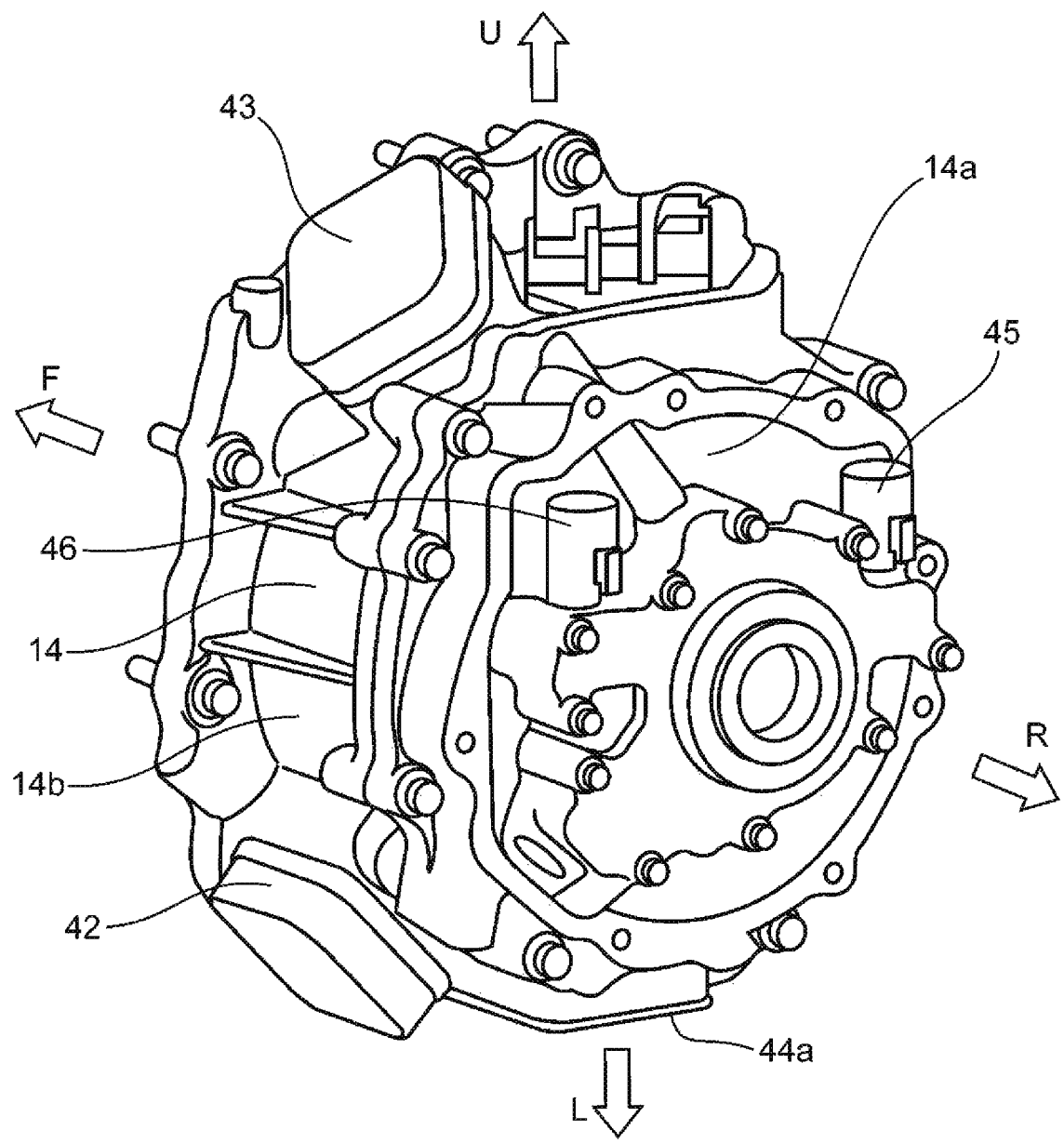
FIG. 6 is a perspective view illustrating arrangement of a heat exchanger and an oil control valve.

As illustrated in FIG. 5 and FIG. 6, two heat exchangers 42, 43 are attached to a side circumferential portion (a side housing 14b) of the motor 14. In this embodiment, the heat exchanger 42 is an example of a "first heat exchanger" in the present disclosure, and the heat exchanger 43 is an example of a "second heat exchanger" in the present disclosure.

As illustrated in FIG. 6, the heat exchanger 42 and the heat exchanger 43 are attached with a space being interposed therebetween in a vehicle vertical direction. In addition, the heat exchanger 42 and the heat exchanger 43 are arranged to be located in front of a rear housing 14a of the motor 14. In other words, the heat exchanger 42 and the heat exchanger 43 are arranged to be located in the side circumferential portion of the motor 14.

Each of the heat exchanger 42 and the heat exchanger 43 has a flat external shape in which a height dimension is smaller than a length dimension and a width dimension. The adoption of the heat exchanger 42 and the heat exchanger 43, each of which has such an external shape, is beneficial to reduce the size of a set configuration in which the heat exchangers 42, 43 are attached to the drive unit 10.

Figure 7:
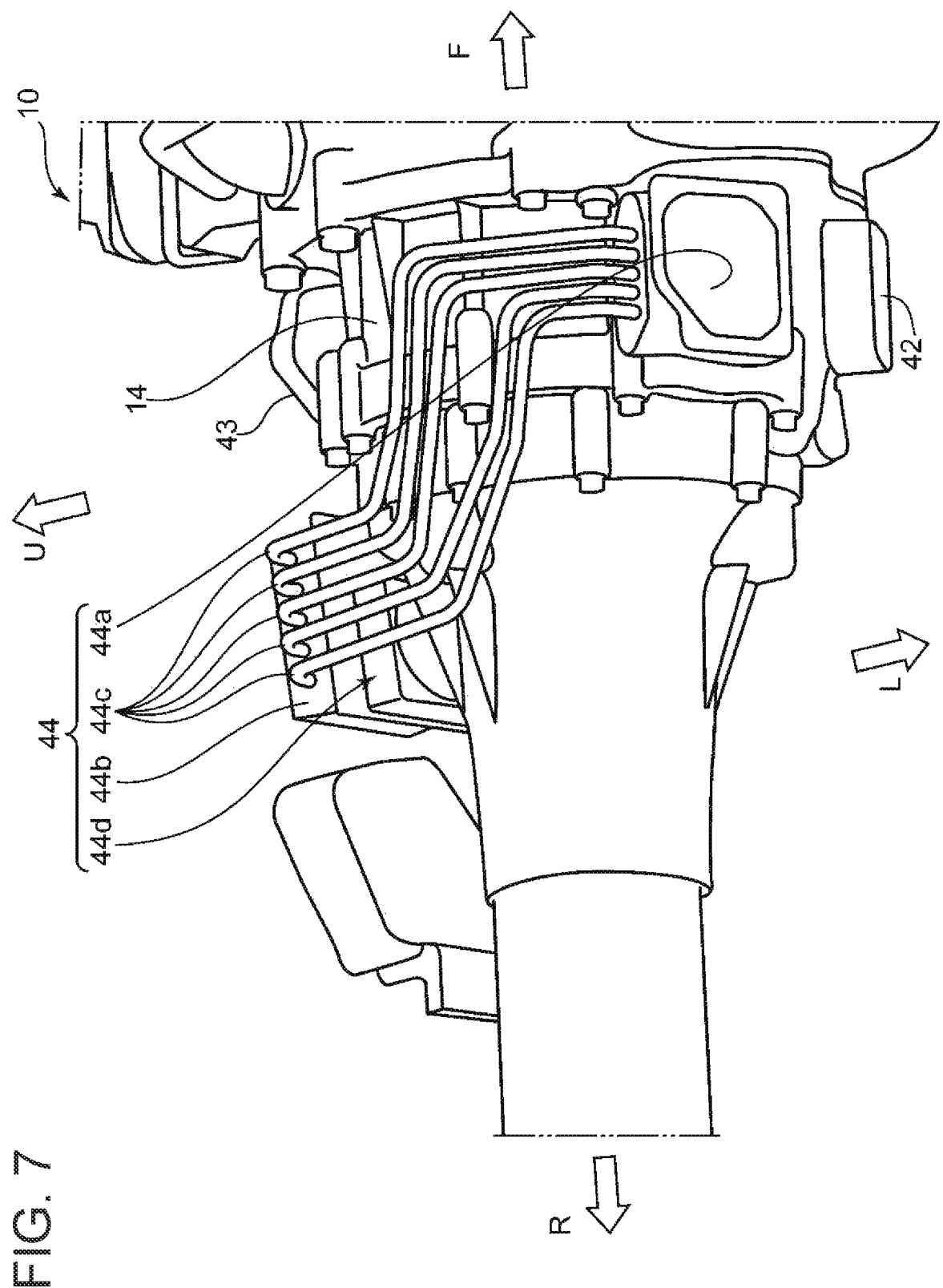
FIG. 7 is a perspective view illustrating arrangement of an ebullient cooler.

As illustrated in FIG. 7, an ebullient cooler 44 is provided from the side circumferential portion of the motor 14 to a rear portion thereof. The ebullient cooler 44 has an ebullient section 44a, a condensation section 44b, pipes 44c, and an ebullient cooler fan 44d. Each of the pipes 44c in the ebullient cooler 44 is filled with an ebullient cooling refrigerant, a boiling point of which is lower than that of oil for cooling the motor 14.

The ebullient section 44a is a section that is attached to the side circumferential portion of the motor 14 for heat exchange between the ebullient cooling refrigerant and the oil for cooling the motor 14 (motor cooling oil).

The condensation section 44b is a section that is arranged behind the motor 14 to condense the ebullient cooling refrigerant that is boiled (evaporated) by the heat exchange in the ebullient section 44a. Each of the pipes 44c is a circulation path for the ebullient cooling refrigerant between the ebullient section 44a and the condensation section 44b. The ebullient cooler fan 44d is a section that promotes the condensation of the ebullient cooling refrigerant by blowing air to the condensation section 44b.

Figure 8:
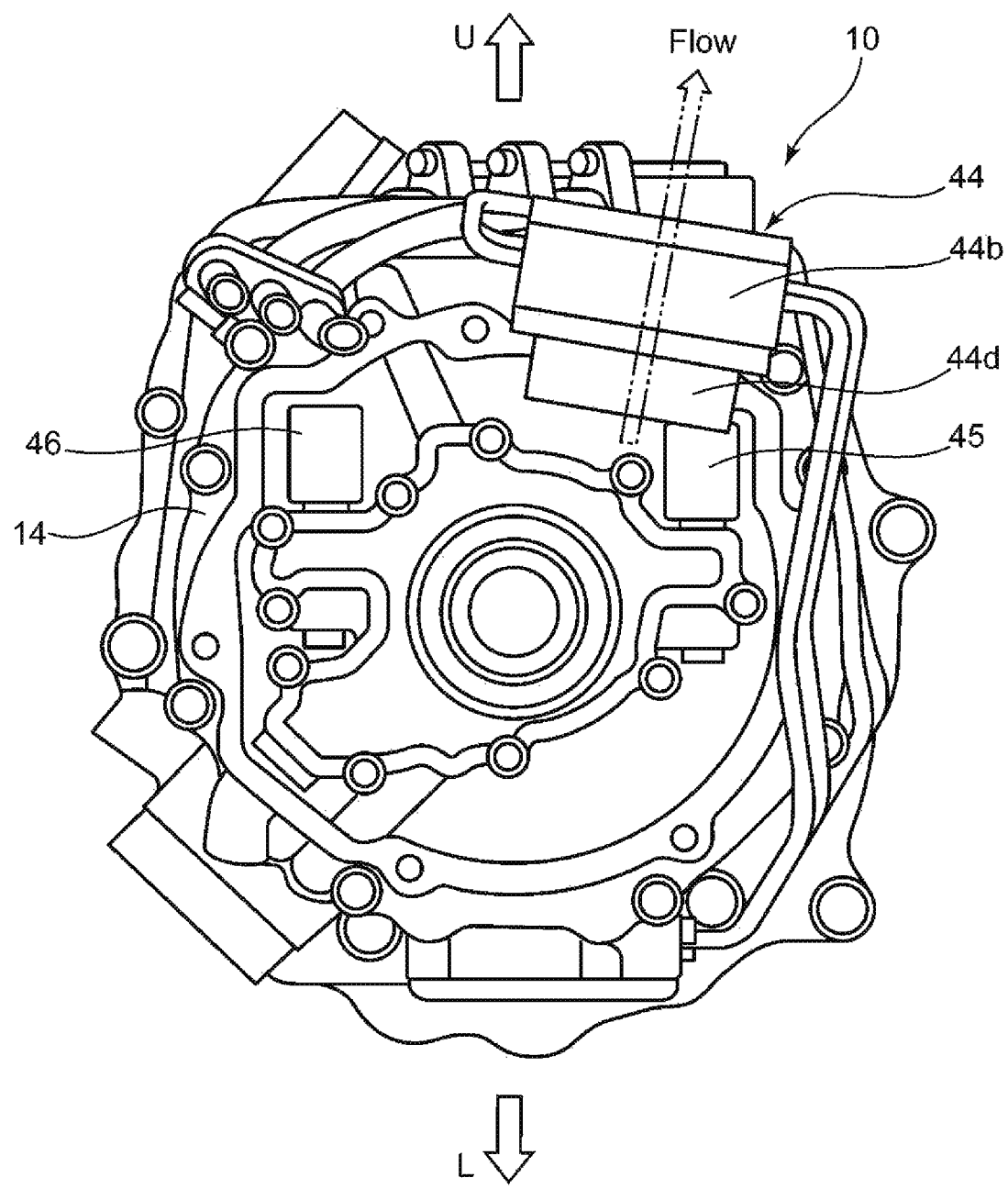
FIG. 8 is a back view illustrating a direction of cooling air blown by an ebullient cooler fan in the ebullient cooler.

Here, as illustrated in FIG. 8, the ebullient cooler fan 44d is arranged adjacent to a lower portion of the condensation section 44b. As indicated by an arrow Flow, the ebullient cooler fan 44d blows the air upwardly from below such that the air flows through the condensation section 44b. By blowing the air in such a direction, hot air can efficiently be discharged from the condensation section 44b. Therefore, the ebullient cooling refrigerant can be condensed with high efficiency in the condensation section 44b.

As illustrated in FIG. 7, in the vehicle 1, the condensation section 44b is arranged behind the motor 14. In this way, it is possible to suppress heat, which is discharged from the condensation section 44b, from being transferred to the motor 14 during travel of the vehicle 1. Thus, this is effective to maintain the motor 14 at an appropriate temperature.

As illustrated in FIG. 6 and FIG. 7, the heat exchangers 42, 43 and the ebullient section 44a are attached in a mutually separated manner to the side housing 14b of the motor 14. Compared to a case where the heat exchangers 42, 43 and the ebullient section 44a are attached to the side housing 14b of the motor 14 in a manner to be close to each other, this is beneficial to downsize the drive unit 10 in the vertical direction and the vehicle width direction of the vehicle 1.

4. Cooling Configuration of Motor 14

A description will be made on a cooling configuration of the motor 14 in the drive unit 10 with reference to FIG. 9.

Figure 9:
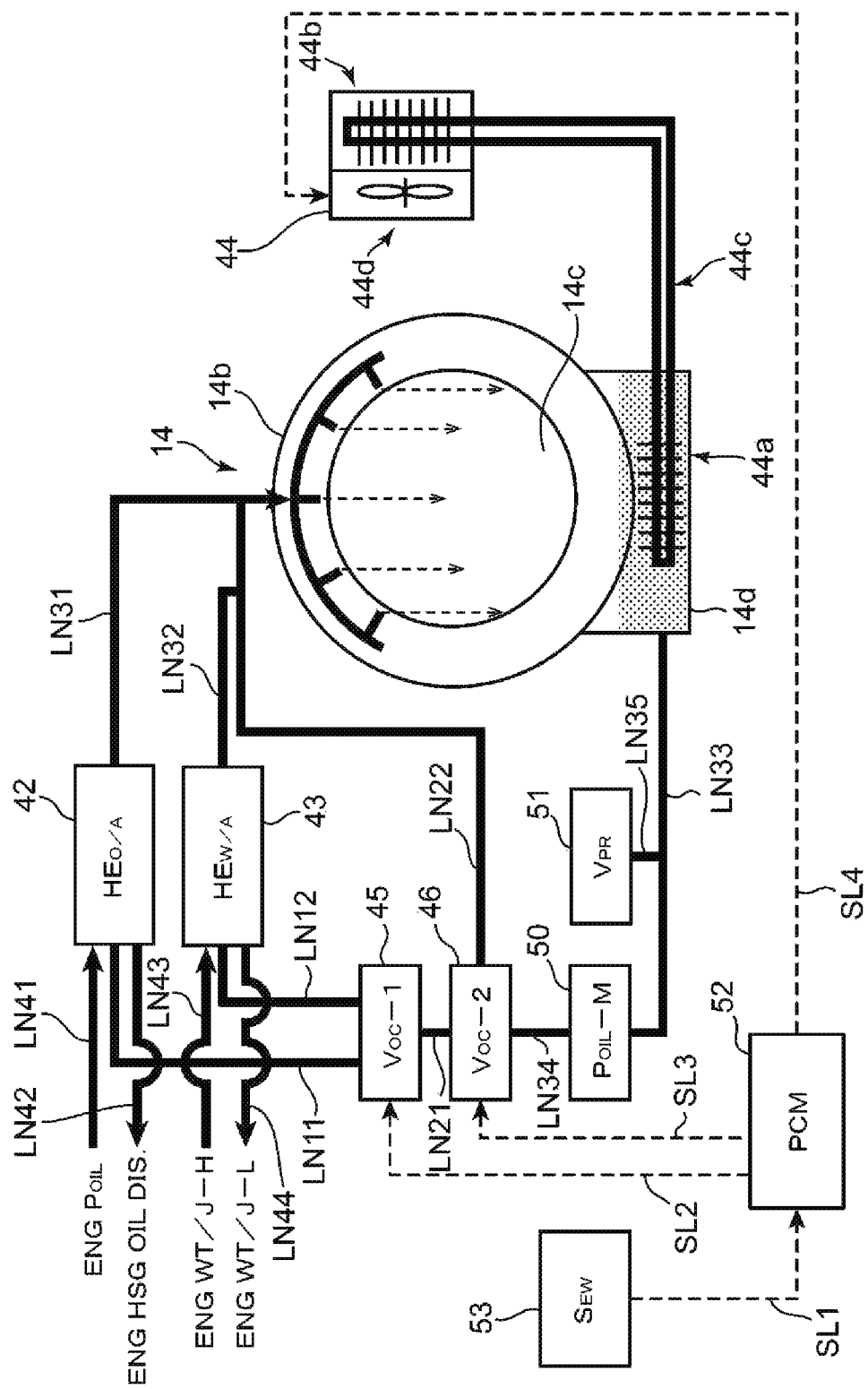
FIG. 9 is a schematic view illustrating a configuration related to cooling of a motor.

As illustrated in FIG. 9, the motor 14 has the housings 14a, 14b (only the side housing 14b is illustrated in FIG. 9), a rotor-stator 14c, and an oil pan 14d. Motor cooling oil paths LN22, LN31, LN32 are connected to upper portions of the housings 14a, 14b. The motor cooling oil path LN31 is an example of a "first motor cooling oil path" in the present disclosure, and the motor cooling oil path LN32 is an example of a "second motor cooling oil path" in the present disclosure.

In the motor-drive mode, the motor cooling oil flows through any of the motor cooling oil paths LN22, LN31, LN32 to cool the rotor-stator 14c and then flows into the oil pan 14d. The motor cooling oil that has been received by the oil pan 14d is delivered to an oil pump 50 for the motor 14 through a motor cooling oil path LN33. A pressure-relief valve 51 is also connected to the motor cooling oil path LN33 via a motor cooling oil path LN35.

The motor cooling oil is delivered from the oil pump 50 to an oil control valve 46 through a motor cooling oil path LN34. The oil control valve 46 is a valve that switches the motor cooling oil delivery path to one of a motor cooling oil path LN21 and the motor cooling oil path LN22.

The motor cooling oil path LN21 is connected to an oil control valve 45. The oil control valve 45 is a valve that switches the oil delivery path to one of a motor cooling oil path LN11 and a motor cooling oil path LN12.

The motor cooling oil path LN11 is an example of a "first motor cooling oil path" in the present disclosure, and the motor cooling oil path LN12 is an example of a "second motor cooling oil path" in the present disclosure. The motor cooling oil path LN11 is connected to the motor cooling oil path LN31 via the heat exchanger 42. The motor cooling oil path LN12 is connected to the motor cooling oil path LN32 via the heat exchanger 43.

In an engine oil circulation path, the engine oil that is pumped out of the oil pump 33 flows from an engine cooling oil path LN41 to an engine cooling oil path LN42 via the heat exchanger 42. The engine oil that has flowed into the engine cooling oil path LN42 through the heat exchanger 42 is delivered to an eccentric shaft. Then, the engine oil lubricates and cools a rotor.

In addition, a portion of the engine oil that has flowed into the engine cooling oil path LN42 is injected into a combustion chamber of each of the engines 11 to 13 to lubricate and cool a housing, an apex seal, and a side seal.

In the heat exchanger 42, the motor cooling oil and the engine oil can exchange the heat. That is, in the motor-drive mode, a temperature of the engine oil can be increased by heat generated in the motor 14. Thus, in the vehicle 1, in the motor-drive mode, the engines 11 to 13, in each of which fuel is not supplied to the combustion chamber, can be warmed. As a result, it is possible to improve engine efficiency at the time when the drive mode is shifted to the engine-drive mode.

In this embodiment, each of the engine cooling oil path LN41 and the engine cooling oil path LN42 are examples of an "engine oil path" in the present disclosure.

In the coolant circulation path for the engines 11 to 13, the coolant that has flowed out of a high-pressure water jacket in each of the engines 11 to 13 flows from an engine coolant path LN43 to an engine coolant path LN44 via the heat exchanger 43. The coolant that has flowed into the engine coolant path LN44 through the heat exchanger 43 is introduced into a low-pressure water jacket in each of the engines 11 to 13.

In the heat exchanger 43, the motor cooling oil and the coolant for cooling the engine can exchange the heat. Also, in this way, in the motor-drive mode, the engines 11 to 13 can be warmed by the heat generated in the motor 14. As a result, it is possible to improve the engine efficiency at the time when the drive mode is shifted to the engine-drive mode.

The ebullient section 44a of the ebullient cooler 44 is disposed in the oil pan 14d of the motor 14. Here, as it has been described with reference to FIG. 7, an outer housing of the ebullient section 44a is attached to the side circumferential portion of the motor 14, and the ebullient cooling refrigerant, with which the pipes 44c are filled, can exchange the heat with the motor cooling oil in the oil pan 14d.

The vehicle 1 also includes a valve control unit 52 and an engine coolant temperature sensor 53. The engine coolant temperature sensor 53 is, for example, provided to a pipe 36 between the engine 13 and the radiator 31. The valve control unit 52 is an example of a "controller" in the present disclosure and is configured to include a microcomputer having a processor (i.e., a central processing unit (CPU)), memory (i.e., ROM and/or RAM), and the like. The valve control unit 52 is connected to the engine coolant temperature sensor 53 by a signal line SL1, is connected to the oil control valves 45, 46 by signal lines SL2, SL3, respectively, and is connected to the ebullient cooler fan 44d of the ebullient cooler 44 by a signal line SL4.

5. Cooling Control Method for Motor 14 Executed by Valve Control Unit 52

In the motor-drive mode, the valve control unit 52 executes switching control of the oil control valves 45, 46 and drive control of the ebullient cooler fan 44d on the basis of information on an engine coolant temperature from the engine coolant temperature sensor 53. More specifically, the valve control unit 52 executes the control as follows.

(1) In the Case where Engine Coolant Temperature is Lower than a First Threshold In the case where the valve control unit 52 determines that the engine coolant temperature is lower than a first threshold, the valve control unit 52 executes the switching control of the oil control valve 46 so as to connect the motor cooling oil path LN34 and the motor cooling oil path LN21, and executes the switching control of the oil control valve 45 so as to connect the motor cooling oil path LN21 and the motor cooling oil path LN11. In this embodiment, the first threshold is 40° C., for example.

In the case where the engine coolant temperature is lower than the first threshold, the motor cooling oil, which has been delivered from the oil pump 50, flows through the motor cooling oil paths LN34, LN21, LN11, LN31 and is introduced into the motor 14. Then, in the heat exchanger 42, the motor cooling oil and the engine oil exchange heat. In this way, it is possible to increase the temperature of each of the engines 11 to 13, in which the fuel is not supplied to the combustion chamber. Thus, the engines 11 to 13 can be warmed while the motor 14 is maintained at the appropriate temperature.

(2) In the Case where Engine Coolant Temperature is Equal to or Higher than the First Threshold and Lower than a Second Threshold In the case where the valve control unit 52 determines that the engine coolant temperature is equal to or higher than the first threshold and is lower than a second threshold, the valve control unit 52 executes the switching control of the oil control valve 46 so as to connect the motor cooling oil path LN34 and the motor cooling oil path LN21, and executes the switching control of the oil control valve 45 so as to connect the motor cooling oil path LN21 and the motor cooling oil path LN12. In this embodiment, the second threshold is 80° C., for example.

In the case where the engine coolant temperature is equal to or higher than the first threshold and is lower than the second threshold, the motor cooling oil, which has been delivered from the oil pump 50, flows through the motor cooling oil paths LN34, LN21, LN12, LN32 and is introduced into the motor 14. Then, in the heat exchanger 43, the motor cooling oil and the coolant exchange heat.

In addition, in the case where the engine coolant temperature is equal to or higher than the first threshold, the ebullient cooler fan 44d of the ebullient cooler 44 receives a command from the valve control unit 52 and is driven.

As it has been described so far, during the travel of the vehicle 1 by the motor 14, it is possible to dissipate the heat generated in the motor 14 via the coolant for the engines 11 to 13 and from the ebullient cooler 44.

(3) In the Case where Engine Coolant Temperature is Equal to or Higher than the Second Threshold In the case where the valve control unit 52 determines that the engine coolant temperature is equal to or higher than the second threshold, the valve control unit 52 executes the switching control of the oil control valve 46 so as to connect the motor cooling oil path LN34 and the motor cooling oil path LN22. Similar to the case where the engine coolant temperature is equal to or higher than the first threshold and is lower than the second threshold, the ebullient cooler fan 44d of the ebullient cooler 44 is driven.

As it has been described so far, in the case where the engine coolant temperature is equal to or higher than the second threshold, the motor cooling oil, which has been delivered from the oil pump 50, flows through the motor cooling oil paths LN34, LN22 and is introduced into the motor 14. Meanwhile, in the case where the engine coolant temperature is equal to or higher than the second threshold, the motor cooling oil does not exchange the heat with any of the coolant and the engine oil.

During the travel of the vehicle 1 by the motor 14, in the case where the engine coolant temperature is equal to or higher than the second threshold, it is possible to dissipate the heat generated in the motor 14 via the ebullient cooler 44.

6. Oil Path in Housings 14a, 14b of Motor 14

A description will be made on the oil path in the housings 14a, 14b of the motor 14 with reference to FIG. 10.

Figure 10:
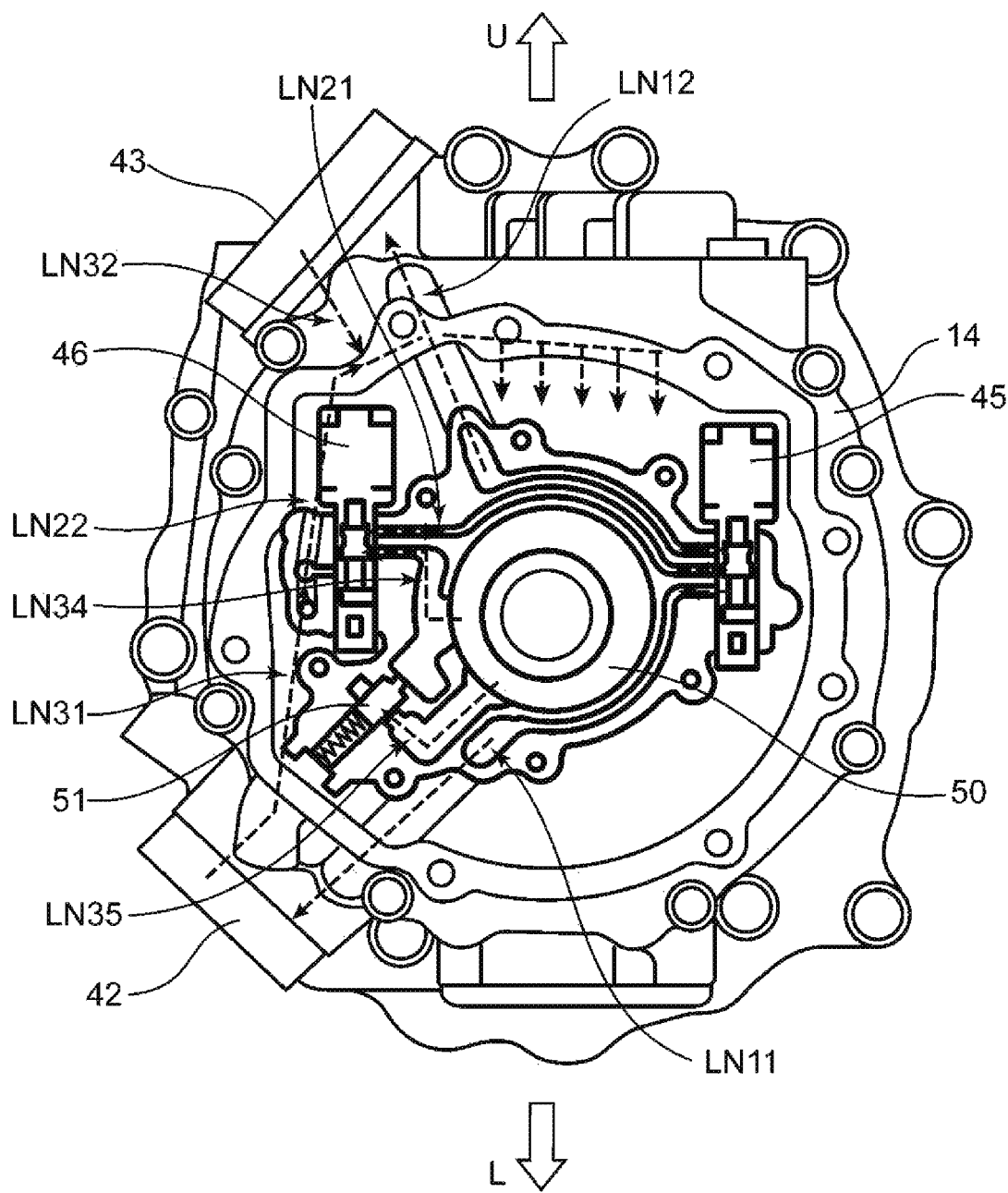
FIG. 10 is a back view (a partially cut cross-sectional view) illustrating an oil path in a housing of the motor.

As illustrated in FIG. 10, the motor cooling oil paths LN11, LN12, LN21, LN22, LN31 to LN35 (the motor cooling oil path LN33 is not illustrated), through each of which the motor cooling oil flows, are provided in the housings 14a, 14b of the motor 14. The housings 14a, 14b are examples of a "motor housing" in the present disclosure.

As illustrated in FIG. 10, when the motor 14 is seen from the rear side in the vehicle longitudinal direction in a state where the rear housing 14b is detached, the oil control valves 45, 46 are arranged above the output shaft. The oil control valve 45 is arranged on a right side in the vehicle width direction, and the oil control valve 46 is arranged on a left side in the vehicle width direction.

The motor cooling oil path LN34 is connected from the oil pump 50 to the oil control valve 46, which is arranged on the left side in the vehicle width direction. The motor cooling oil path LN35 is connected to the pressure-relief valve 51 that is arranged below the oil control valve 46.

The motor cooling oil path LN21 is connected to the oil control valve 46. The motor cooling oil path LN21 is formed to be curved on an upper outer circumference of the output shaft. The other end of the motor cooling oil path LN21 is connected to the oil control valve 45.

The motor cooling oil path LN22 is also connected to the oil control valve 46. The other end of the motor cooling oil path LN22 is connected to the housings 14a, 14b of the motor 14 such that the motor cooling oil can flows through the rotor-stator 14c accommodated in the housings 14a, 14b.

The motor cooling oil path LN11 and the motor cooling oil path LN12 are connected to the oil control valve 45. The motor cooling oil path LN11 is formed to be curved on a lower outer circumference of the output shaft. The other end of the motor cooling oil path LN11 is connected to the heat exchanger 42. The motor cooling oil path LN12 is formed to be curved on further upper outer circumference of the motor cooling oil path LN21. The other end of the motor cooling oil path LN12 is connected to the heat exchanger 43.

One end of the motor cooling oil path LN31 is connected to the heat exchanger 42, and the other end thereof is connected to the motor cooling oil path LN22. The motor cooling oil, which has flowed through the heat exchanger 42, flows from the motor cooling oil path LN31 into the housings 14a, 14b of the motor 14 via the motor cooling oil path LN22.

One end of the motor cooling oil path LN32 is connected to the heat exchanger 43, and the other end thereof is connected to the motor cooling oil path LN22. The motor cooling oil, which has flowed through the heat exchanger 43, flows from the motor cooling oil path LN32 into the housings 14a, 14b of the motor 14 via the motor cooling oil path LN22.

As it has been described so far, in the vehicle 1 according to this embodiment, the motor cooling oil paths LN11, LN12, LN21, LN22, LN31 to LN35 are formed in the housings 14a, 14b of the motor 14. In this way, compared to a case where the motor cooling oil paths LN11, LN12, LN21, LN22, LN31 to LN35 are formed on the outside of the housings 14a, 14b, it is possible to shorten the paths. In addition, the formation of the motor cooling oil paths LN11, LN12, LN21, LN22, LN31 to LN35 not on the outside of the housings 14a, 14b of the motor 14 is further effective for downsizing the drive unit 10 in the state where the heat exchangers 42, 43 are disposed.

7. Engine Coolant Path in Housing 11a of Engines 11 to 13

In the vehicle 1 according to this embodiment, the engine cooling oil paths LN41, LN42 including portions led to the heat exchanger 42 are formed in a housing 11a of the engines 11 to 13. In the vehicle 1 according to this embodiment, the engine coolant paths LN43, LN44 including portions led to the heat exchanger 43 are formed in a housing 11a of the engines 11 to 13.

Figure 11:
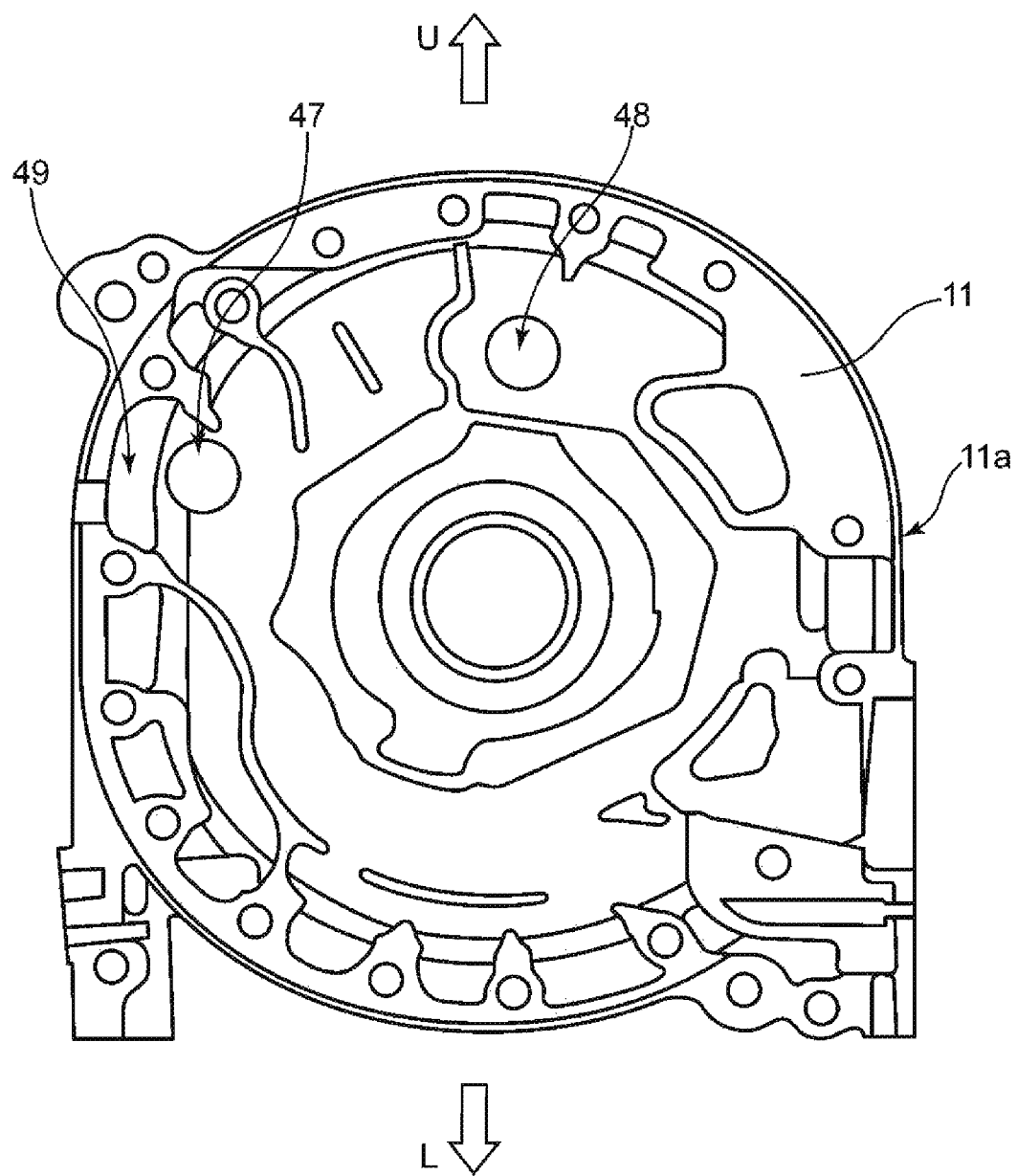
FIG. 11 is a back view illustrating a coolant path in a housing of an engine.

As illustrated in FIG. 11, a high-pressure coolant path 49 (including the engine coolant path LN43) is formed on an outer circumference of the housing 11a of the engine 11. The housing 11a of the engine 11 is provided with a coolant inlet port 47 and a coolant outlet port 48 in a portion on an inner side of the high-pressure coolant path 49. Although not illustrated, similarly, the engine cooling oil paths LN41, LN42 are formed in the housing 11a of the engines 11 to 13.

[Modified Examples]

In the vehicle 1 according to the above embodiment, the drive unit 10, which is configured to include the three engines 11 to 13 and the single motor 14, is adopted. However, the present invention is not limited thereto. For example, a drive unit configured to include a single engine and a single motor or a drive unit configured to include a plurality of engines and a plurality of motors can be adopted.

In the vehicle 1 according to the above embodiment, each of the engines 11 to 13 is the rotary engine. However, a reciprocating engine can be adopted for the present invention. Here, in the vehicle 1 according to the above embodiment, for which the rotary engine is adopted, the drive unit 10 can be made to be compact. This is beneficial to achieve a higher vehicle motion performance.

In the vehicle 1 according to the above embodiment, the oil cooler 32 does not include a cooling fan. However, the present invention is not limited thereto. The oil cooler can include the cooling fan or can be added with a mechanism capable of spraying misty water onto a fin of the oil cooler.

In the above embodiment, an FR (front engine, rear-wheel drive) vehicle is adopted as an example of the vehicle 1. However, the present invention is not limited thereto. For example, an RR (rear engine, rear-wheel drive) vehicle, in which the drive unit is mounted in a rear portion and transmits the drive power to rear wheels, an MR (mid-engine, rear-wheel drive) vehicle, in which the drive unit is mounted to a position behind a driver's seat to transmit the drive power to rear wheels, or further an FF (front engine, front-wheel drive) vehicle, in which the drive unit is mounted to a rear portion of a front area to transmit the drive power to front wheels, can be adopted.

In the above embodiment, a spool valve is adopted for each of the oil control valves 45, 46. However, the present invention is not limited thereto. For example, a poppet valve or a slide valve can be adopted therefor.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS 1 vehicle
10 drive unit
11 to 13 engine
11a housing (engine housing)
14 motor
14a rear housing (motor housing)
14b side housing (motor housing)
26 battery
29 drive mode control unit
31 radiator
32 oil cooler
42 heat exchanger (first heat exchanger)
43 heat exchanger (second heat exchanger)
44 ebullient cooler
44a ebullient section
44b condensation section
44d ebullient cooler fan
45 oil control valve
47 coolant inlet port
48 coolant outlet port
49 high-pressure coolant path
52 valve control unit (controller)
LN11, LN31 motor cooling oil path (first motor cooling oil path)
LN12, LN32 motor cooling oil path (second motor cooling oil path)
LN41, LN42 engine oil path
LN43, LN44 coolant path

The invention claimed is:

1. A vehicle comprising:
a drive unit that is a drive source for travel of the vehicle and includes an engine and a motor arranged adjacent to each other in a first direction of the vehicle;
an engine oil path as a path of engine oil for cooling the engine;
a coolant path as a path of a coolant for cooling the engine;
a motor cooling oil path as a path of oil for cooling the motor;
a first heat exchanger by which the engine oil flowing through the engine oil path and the oil flowing through the motor cooling oil path exchange heat; and
a second heat exchanger by which the coolant flowing through the coolant path and the oil flowing through the motor cooling oil path exchange the heat, wherein
when the drive unit is seen in the first direction, the motor is formed to have a smaller size in a second direction, which is orthogonal to the first direction, than the engine, and
the first heat exchanger and the second heat exchanger are attached to a side circumferential portion of the motor.

2. The vehicle according to claim 1, wherein
the engine includes a piston and an engine housing that accommodates the piston,
the motor includes a rotor-and-stator and a motor housing that accommodates the rotor-and-stator,
the engine oil path and the coolant path are formed in the engine housing, and
the motor cooling oil path is formed in the motor housing.

3. The vehicle according to claim 2, wherein
the first direction of the vehicle is a longitudinal direction of the vehicle, and
the first heat exchanger and the second heat exchanger are attached in a mutually separated manner in a vertical direction to the side circumferential portion of the motor.

4. The vehicle according to claim 3 further comprising:
an ebullient cooler including:
a circulation path for circulating an ebullient cooling refrigerant, a boiling point of which is lower than that of the oil for cooling the motor;
an ebullient section that is disposed in the middle of the circulation path and in which the oil and the ebullient cooling refrigerant exchange heat; and
a condensation section that condenses the ebullient cooling refrigerant.

5. The vehicle according to claim 4, wherein
the ebullient cooler further includes an ebullient cooler fan that is arranged adjacent to a lower portion of the condensation section and cools the condensation section by air, and
the ebullient cooler fan blows the air upward.

6. The vehicle according to claim 5, wherein
the first direction of the vehicle is the longitudinal direction of the vehicle,
the motor is arranged adjacent to a rear side of the engine in the first direction, and
the condensation section and the ebullient cooler fan of the ebullient cooler are arranged adjacent to a rear side of the motor in the first direction.

7. The vehicle according to claim 6, wherein
in the case where the first heat exchanger, the second heat exchanger, and the ebullient section of the ebullient cooler are seen in the first direction of the vehicle, the first heat exchanger, the second heat exchanger, and the ebullient section of the ebullient cooler are attached in a mutually separated manner to the side circumferential portion of the motor.

8. The vehicle according to claim 7, wherein
the motor cooling oil path includes a first motor cooling oil path and a second motor cooling oil path that are different paths from each other,
in the first heat exchanger, the engine oil flowing through the engine oil path and the oil flowing through the first motor cooling oil path exchange heat,
in the second heat exchanger, the coolant flowing through the coolant path and the oil flowing through the second motor cooling oil path exchange heat, and
the vehicle further comprises:
an oil control valve for switching between the first motor cooling oil path and the second motor cooling oil path;
an engine coolant temperature sensor for detecting a temperature of the engine; and
a controller for controlling the oil control valve on the basis of the temperature of the engine.

9. The vehicle according to claim 8, wherein
each of the first heat exchanger and the second heat exchanger has a flat external shape in which a height in an attachment direction to the side circumferential portion of the motor is smaller than a length and a width in a direction that crosses the attachment direction.

10. The vehicle according to claim 6, wherein
in the case where the first heat exchanger, the second heat exchanger, and the ebullient section of the ebullient cooler are seen in the first direction of the vehicle, the first heat exchanger, the second heat exchanger, and the ebullient section of the ebullient cooler are attached in a mutually separated manner to the side circumferential portion of the motor.

11. The vehicle according to claim 1, wherein
the first direction of the vehicle is a longitudinal direction of the vehicle, and
the first heat exchanger and the second heat exchanger are attached in a mutually separated manner in a vertical direction to the side circumferential portion of the motor.

12. The vehicle according to claim 11, wherein
the motor cooling oil path includes a first motor cooling oil path and a second motor cooling oil path that are different paths from each other,
in the first heat exchanger, the engine oil flowing through the engine oil path and the oil flowing through the first motor cooling oil path exchange heat,
in the second heat exchanger, the coolant flowing through the coolant path and the oil flowing through the second motor cooling oil path exchange heat, and
the vehicle further comprises:
an oil control valve for switching between the first motor cooling oil path and the second motor cooling oil path;
an engine coolant temperature sensor for detecting a temperature of the engine; and
a controller for controlling the switching means on the basis of the temperature of the engine.

13. The vehicle according to claim 11, wherein
each of the first heat exchanger and the second heat exchanger has a flat external shape in which a height in an attachment direction to the side circumferential portion of the motor is smaller than a length and a width in a direction that crosses the attachment direction.

14. The vehicle according to claim 1 further comprising:
an ebullient cooler includes:
a circulation path for circulating an ebullient cooling refrigerant, a boiling point of which is lower than that of the oil for cooling the motor;
an ebullient section that is disposed in the middle of the circulation path and in which the oil and the ebullient cooling refrigerant exchange heat; and
a condensation section that condenses the ebullient cooling refrigerant.

15. The vehicle according to claim 14, wherein
the ebullient cooler further includes an ebullient cooler fan that is arranged adjacent to a lower portion of the condensation section and cools the condensation section by air, and
the ebullient cooler fan blows the air upward.

16. The vehicle according to claim 14, wherein
the motor cooling oil path includes a first motor cooling oil path and a second motor cooling oil path that are different paths from each other,
in the first heat exchanger, the engine oil flowing through the engine oil path and the oil flowing through the first motor cooling oil path exchange heat,
in the second heat exchanger, the coolant flowing through the coolant path and the oil flowing through the second motor cooling oil path exchange heat, and
the vehicle further comprises:
an oil control valve for switching between the first motor cooling oil path and the second motor cooling oil path;
an engine coolant temperature sensor for detecting a temperature of the engine; and
a controller for controlling the switching means on the basis of the temperature of the engine.

17. The vehicle according to claim 14, wherein
each of the first heat exchanger and the second heat exchanger has a flat external shape in which a height in an attachment direction to the side circumferential portion of the motor is smaller than a length and a width in a direction that crosses the attachment direction.

18. The vehicle according to claim 1, wherein
the motor cooling oil path includes a first motor cooling oil path and a second motor cooling oil path that are different paths from each other,
in the first heat exchanger, the engine oil flowing through the engine oil path and the oil flowing through the first motor cooling oil path exchange heat,
in the second heat exchanger, the coolant flowing through the coolant path and the oil flowing through the second motor cooling oil path exchange heat, and
the vehicle further comprises:
an oil control valve for switching between the first motor cooling oil path and the second motor cooling oil path;
an engine coolant temperature sensor for detecting a temperature of the engine; and
a controller for controlling the switching means on the basis of the temperature of the engine.

19. The vehicle according to claim 18, wherein
each of the first heat exchanger and the second heat exchanger has a flat external shape in which a height in an attachment direction to the side circumferential portion of the motor is smaller than a length and a width in a direction that crosses the attachment direction.

20. The vehicle according to claim 1, wherein
the motor provided in the drive unit is arranged adjacent to a rear side of the engine, and the engine and the motor have a direct-coupling structure to share an output shaft.

* * * * *